Patented June 5, 1934

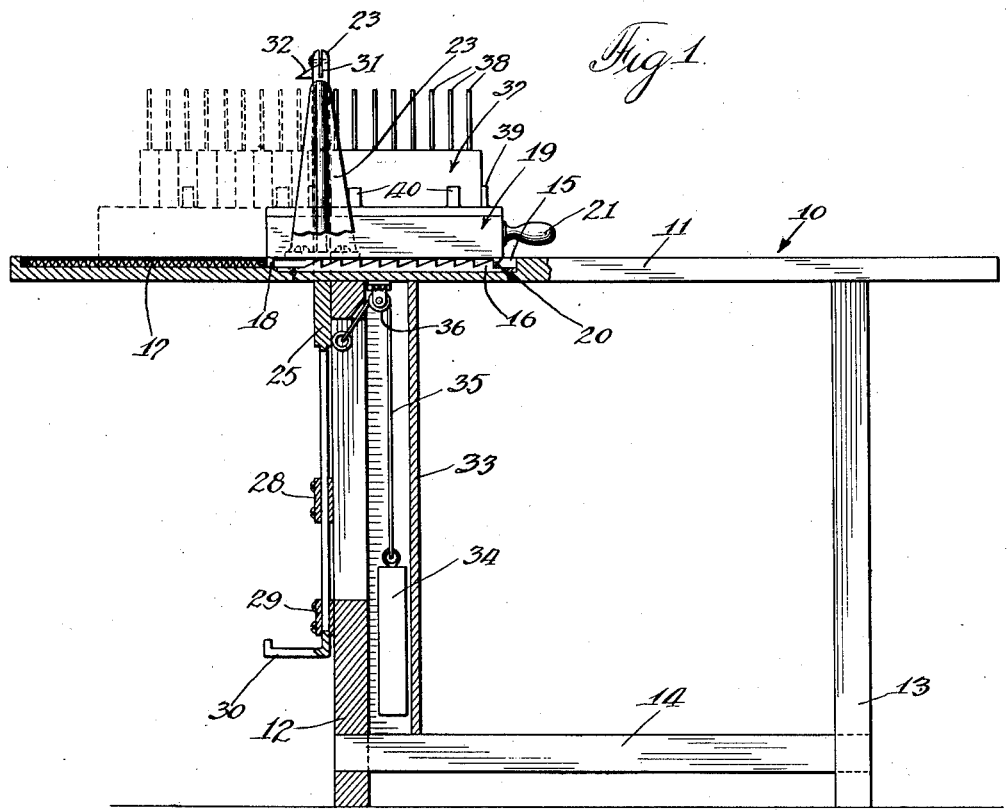
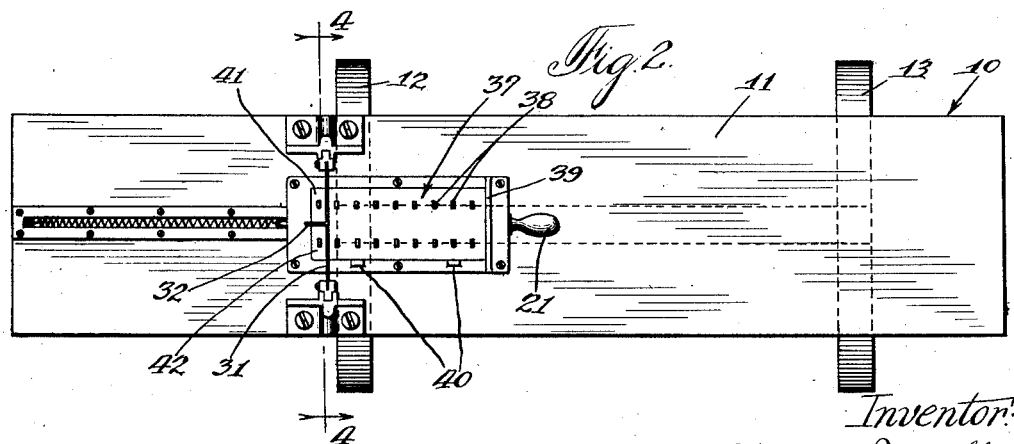

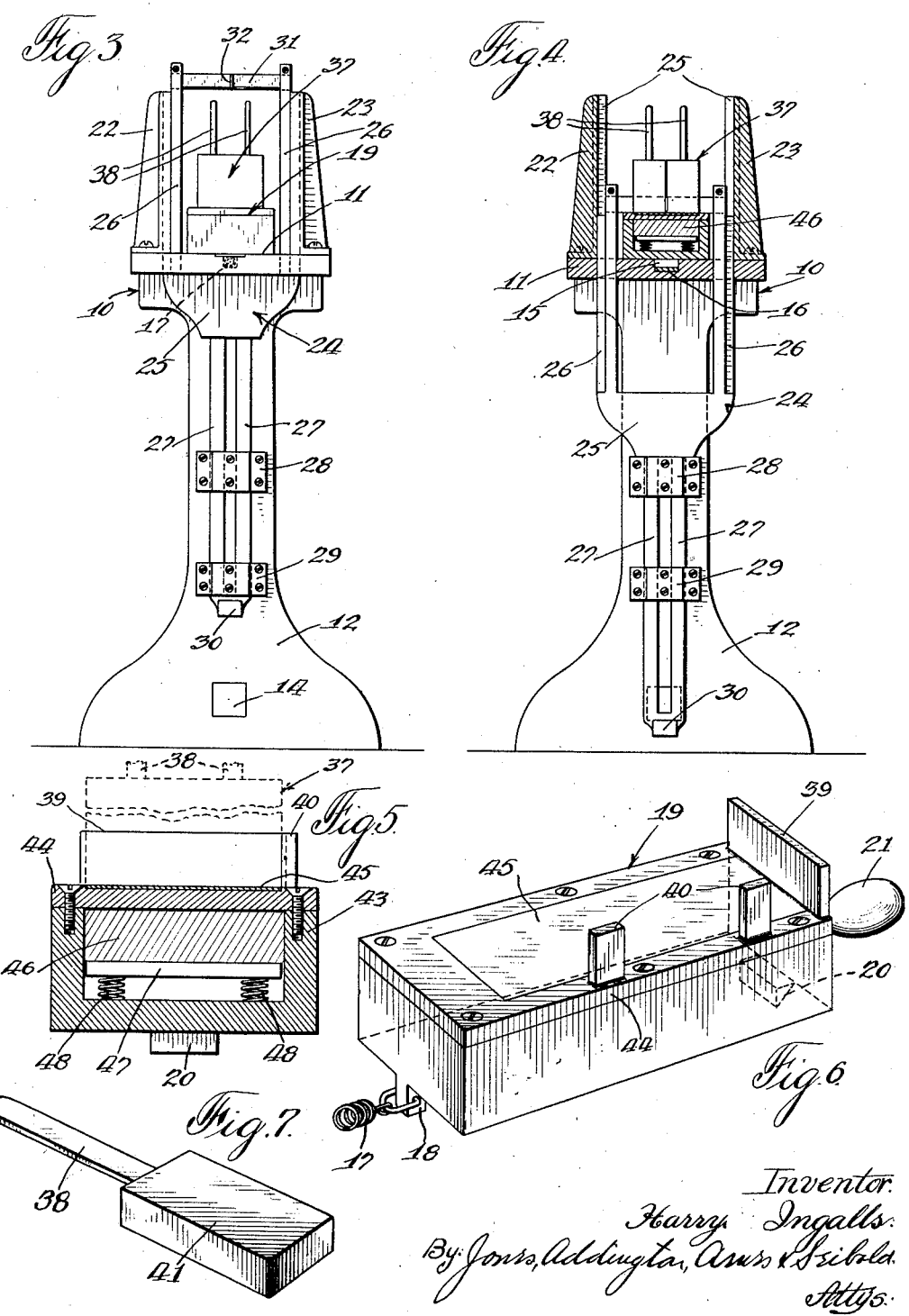

1,961,690

UNITED STATES PATENT OFFICE 1,961,690

METHOD FOR CUTTING FROZEN SUBSTANCES

Harry Ingalls, Chicago, Ill., assignor, by mesne assignments, to E. F. Whitchurch, La Grange, Ill.

Application June 13, 1931, Serial No. 544,280
Renewed March 12, 1934

2 Claims. (Cl. 107—54)

This invention relates to a method for coating frozen substances of a general character which are soft or fluid at normal temperatures and has special reference to a method and apparatus for cutting bricks or frozen masses of ice cream, custards, sherbets, and the like, into a plurality of individual portions.

More particularly, this invention relates to an apparatus comprising a refrigerating unit employed as a support for a frozen mass, such as a brick or frozen mass of ice cream, custard, or sherbets, and a cutting mechanism associated therewith for producing individual portions therefrom. Also, this invention contemplates the method of forming individual portions from a frozen mass which consists in depositing the latter on a supporting platform, which platform is of a temperature substantially the same or lower than that of the supported substance and in cutting the frozen substance into a plurality of individual units for consumption while resting upon the platform.

The apparatus and method of the present invention is employed in the manufacture of a frozen confection which comprises a center portion of ice cream, custard, sherbet, and the like, which is soft or fluid at normal temperature and hardens or congeals at lower temperatures, the central portion being preferably covered with an edible flavoring coating which is comparatively hard at normal temperatures so that it may be handled without losing its shape by the merchant and eaten by the consumer without substantial inconvenience as might any other confection. The present apparatus is particularly adapted for use in connection with cutting individual portions from a substantial frozen mass into which sticks have been inserted for handles in holding the confection.

The brick or frozen mass of ice cream or custard must be removed from the refrigerator in which it is kept preparatory to its being cut into individual portions to be subsequently coated. The room into which it is moved is, of course, kept at a normal temperature whereupon the frozen substance is subject to returning to its normal soft or fluid state by reason of the higher temperature. The cutting action requires but a comparatively small amount of time and only the outer surfaces of the frozen mass actually become soft or liquid. In so far as applicant is aware, heretofore the frozen mass has merely been placed on a table or other support which is of the same temperature as that of the room and, as a result thereof, even in the comparatively short time which it requires to cut the brick into its individual portions, a face layer of from $\frac{1}{16}$th to $\frac{1}{8}$th of an inch has been softened and stripped by the support from the contracting bottom surface of the mass as the individual portions are removed. The collection of this melted or softened substance from succeeding bricks of ice cream that are cut is conducive of unsanitary conditions besides being a financial loss both as to physical substance and the comparatively great amount of time and effort expended to keep the supporting surface free from such accumulation.

Inasmuch as the individual portions are ordinarily dipped into a body of melted chocolate or like coating material, it is highly desirable to keep the outer surface of the individual portions in a solid state or else the outer melted or soft coating, upon being dipped into the heated fluid chocolate, will become mixed therewith to contaminate the coating. Heretofore, applicant is informed, a substantial amount of the coating is wasted owing to the fact that the coating absorbs so much of the melted center portion that it becomes undesirable for further use as coating and is thrown out whereby a new batch of coating must be substituted. This has a further undesirable characteristic in that the coating after a few dippings becomes granulated to a substantial extent and thereby becomes undesirable.

The present invention contemplates the provision of a supporting platform for the frozen mass which support is kept at substantially the same or lower temperature than that of the frozen mass whereby the contacting bottom surface of the individual portions are at least as solid as before they were removed from the refrigerator prior to being cut, if not more solid, so that there is no face layer stripped therefrom and the individual portion is in such a condition that none of the material therefrom mixes with the coating. The supporting refrigerated surface is kept wholly free and clean from the material of the frozen mass, thereby avoiding unsanitary conditions and the loss of time and effort occasioned as above decribed with reference to such cutting as has been heretofore employed.

One of the objects of this invention is to provide a method for forming individual units from a frozen mass to be employed in the manufacture of a frozen confection.

Another object of this invention is to provide an apparatus wherein there is no waste or unsanitary conditions occasioned by the cutting of a frozen mass into individual portions.

A still further object of this invention is to provide a refrigerating unit as a support in association with a cutting device in an apparatus for cutting bricks of ice cream, sherbets, and the like, into a plurality of individual portions in the manufacture of frozen confections.

Other objects and advantages will hereinafter be more particularly pointed out and for a further understanding of the characteristic features of this invention reference may now be had to the following description and the accompanying drawings, in which latter:

Figure 1 is a side elevational view of an apparatus embodying the features of this invention, showing a portion thereof in central vertical cross section;

Fig. 2 is a plan view of Figure 1;

Fig. 3 is an end elevational view of Figure 1;

Fig. 4 is a vertical sectional view taken on the line 4—4 of Fig. 2;

Fig. 5 is a sectional view of the refrigerating unit employed in the apparatus shown in Figure 1;

Fig. 6 is a perspective view of the member shown in Fig. 5; and

Fig. 7 is a perspective view of the frozen confection in its finished commercial state.

Referring now more particularly to the drawings, the apparatus of this invention comprises a table or bench 10 having a table top 11 resting on any suitable support such, for example, as uprights 12 and 13, which latter are suitably cross braced by a member 14. The table 10 in the present instances has been shown as being formed of wood, although it is to be understood that the same may be made of sheet metal or castings of any material. The upper surface of the table top 11 is provided lengthwise thereof with a slot 15 for receiving in a fixed relation therewith a rack 16 at one end thereof, the rack being suitably secured to the lower surface of the slot by means of screws or any other securing members. The other end of the slot encloses a coil spring 17, one end of the coil spring being secured to the outer end of the slot and the other end of the coil spring being secured to a lug 18 on a refrigerated supporting platform 19.

The refrigerated supporting platform 19 is adapted to have longitudinal movement with respect to the table 10, the movement of the platform 19 being predetermined by the engagement of a toothed member 20 with the teeth of the rack 16. In order to accomplish this predetermined movement, the rack 16 has a plurality of equally spaced teeth corresponding to the desired travel of the supporting platform 19, the latter having its tooth 20 engaging consecutively each tooth of the rack 16 upon an upward tilting of the platform and a subsequent pulling action of the coil spring 17 to urge it in a direction toward its fastened end. In tilting the supporting platform 19, a handle 21 secured to the end of the refrigerated platform upon which the tooth 20 is formed, is raised to disengage the tooth from the rack 16, the supporting platform 19 pivoting on the upper surface of the top 11 at its other end adjacent the lug 18. The coil spring 17 acts to urge the supporting platform in the proper direction, and, as will hereinafter be more particularly pointed out, the toothed member 20 engages consecutively each tooth of the rack 16 for predetermining the thickness of the slices of the frozen mass supported by the platform.

The cutting mechanism associated with the refrigerated supporting platform 11 preferably comprises a pair of oppositely disposed guide members 22 and 23 for receiving and guiding a vertically reciprocal knife holder 24, which latter is preferably foot operated. Each of the guide members 22 and 23 comprises a bracket extending upwardly from and supported on the supporting surface 11 of the table 10, the brackets having a U-shaped vertically extending groove 25 for receiving the guide rods 26 of the knife holder 24. The guide rods 26, in turn, are preferably integrally formed with and extend upwardly from a main body portion 25, the lower end of the main body portion having depending therefrom a second pair of guide rods 27 disposed in a spaced relation and extending through the guide members 28 and 29 secured to the upright 12. The upper guide member 28 limits the downward movement of the knife holder 24, the body portion 25 forming a shoulder at its junction with the guide rods 27 for abutting against the upper end of the guide member 28. The lower end of the guide rods 27 are joined and project outwardly from the upright 12 to form a foot treadle 30 for the operation of the knife holder.

A knife blade 31 is preferably removably and adjustably secured between the upper ends of the guide members 22 and 23, the blade having a blade portion 32 substantially centrally thereof and extending at right angles thereto in order that the frozen material may be cut both in a lateral and longitudinal direction. A housing 33 is disposed beneath the top 11 of the table and adjacent to the upright 12 for enclosing a weighted member 34 which has vertical movement therein to return the cutting member to an initial position. The upper end of the weighted member 34 is secured to a cord or wire 35 which extends over a pulley 36 and is secured to the body portion 25 of the knife holder 24. The above means of return is preferable since an even pressure is developed in contrast to some such means as a spring which develops a greater pressure the more the spring is compressed. The refrigerated supporting platform 19 is adapted to travel between the guide members 22 and 23 and to carry a frozen mass, such as a brick of ice cream to position the same beneath the cutting blade.

The brick of ice cream 37 is shown as being of a rectangular cross section and is provided with two rows of equidistantly spaced sticks 38 which are inserted a substantial distance into the ice cream such that they may support the individual portions when cut. The brick is supported on the upper surface of the supporting platform 19 and is held in a predetermined position thereon by means of an end member 39 and a pair of side lugs 40 against which the brick of ice cream is placed.

In the operation of the device thus far described, a brick of ice cream is placed in position on the supporting surface of the platform 19 against the positioning members 39 and 40 and the supporting platform 19 is moved into position such that the tooth 20 engages the first tooth of the rack 16. The position of the knife blades 31 and 32 is such as to either trim the end of the brick of ice cream or take the first cut thereof in forming the individual portions. Referring more particularly to Fig. 2, it will be noted that the knife blades 31 and 32 are positioned in such a manner that a downward movement thereof will sever two individual portions 41 and 42 from the brick.

In the operation of the machine, the foot treadle 30, shown more particularly in Figure 1, is pressed downwardly against the weight 34, which latter, in the present instance, is approximately seventeen pounds and the blades are lowered to cut the brick. The blades are so adjusted on the guide members 26 that when the main body portion 25 of the blade holding member abuts against the upper guide member 28, the edge of the blade just touches the upper surface of the supported platform 19 to insure a clean cut. After the weight 34 has moved the cutting member into its upper position, the supporting platform is then moved forwardly by means of tilting the same on one end by raising the handle 21 on the other end to disengage the tooth 20 from the first tooth of the rack 16, the spring 17 moving the supporting platform 19 until the tooth 20 engages the second tooth of the rack 16. The foot lever 30 is again depressed and the cycle is repeated for each successive piece until the entire brick has been cut into individual portions, it being noted that the last downward movement of the knife members merely trims the end of the brick and cuts the brick centrally. The individual portions are then ready for coating in any desired manner, or, if no coating is desired, for immediate consumption.

The refrigerated supported platform 19, as shown more particularly in Fig. 6 of the drawings, comprises a box-like member 43 formed preferably of an insulating material and, in the present instance, of bakelite. The box has a cover 44 thereover which is suitably fastened as by means of screws to the upper ends of the box 43. In order to provide for a desirable cutting surface, the cover has a tinned copper surface 45, although this may or may not be provided, as desired. Inasmuch as the upper surface is the one to be refrigerated, it may be desirable to have the cover cut away or formed of a thin shell or wall, although any form of construction assuring a refrigerated surface may be employed. The box is shown as being adapted particularly for the purpose of containing a piece of dry ice 46, which latter is disposed on a platform 47 held in an upward position by means of coil spring members or other resilient means 48. The spring pressed platform 47 holds the dry ice against the cover 44 and provides a highly refrigerated supporting surface for the frozen mass.

I have specifically mentioned the use of dry ice in connection with this refrigerating unit for the reason that the same is of an extremely low temperature and will provide a supporting surface of a substantially lower temperature than the brick of ice cream or other frozen mass deposited thereon to be cut. However, it is to be understood that any usual method of refrigeration may be employed in lieu of the dry ice and desirable results obtained therefrom in so far as the supporting surface is kept at a substantially low temperature.

As a result of this invention, a method of cutting frozen masses has been obtained whereby the substance to be cut leaves the surface thereof after being cut in the same condition or at even a lower temperature than when removed from the place of storage. This is, of course, highly desirable in that it prevents waste and unsanitary conditions on the supporting surface where it is cut and also prevents the contamination of the coating in which it is subsequently dipped. Also, a novel apparatus is obtained in which the combination of a movable refrigerated platform with reciprocating knife blades has resulted in a very efficient and economical construction.

While but a single embodiment of this invention is herein shown and described, it is to be understood that various modifications thereof may be apparent to those skilled in the art without departing from the spirit and scope of this invention and, therefore, the same is only to be limited by the scope of the prior art and the appended claims.

I claim:

1. The method of forming individual portions in a room of normal temperature from a frozen mass liquid at said normal room temperature which consists in depositing said mass on a supporting platform of a temperature lower than that of the freezing point of said frozen mass, and in cutting said frozen mass while on said platform.

2. The method of forming individual portions in a room of normal temperature from a frozen mass liquid at said normal room temperature which consists in depositing said mass on a supporting platform of a temperature lower than that of the freezing point of said frozen mass, in cutting said frozen mass while on said platform, and in coating said individual portions.

HARRY INGALLS.